United States Patent Office 3,015,295
Patented Jan. 2, 1962

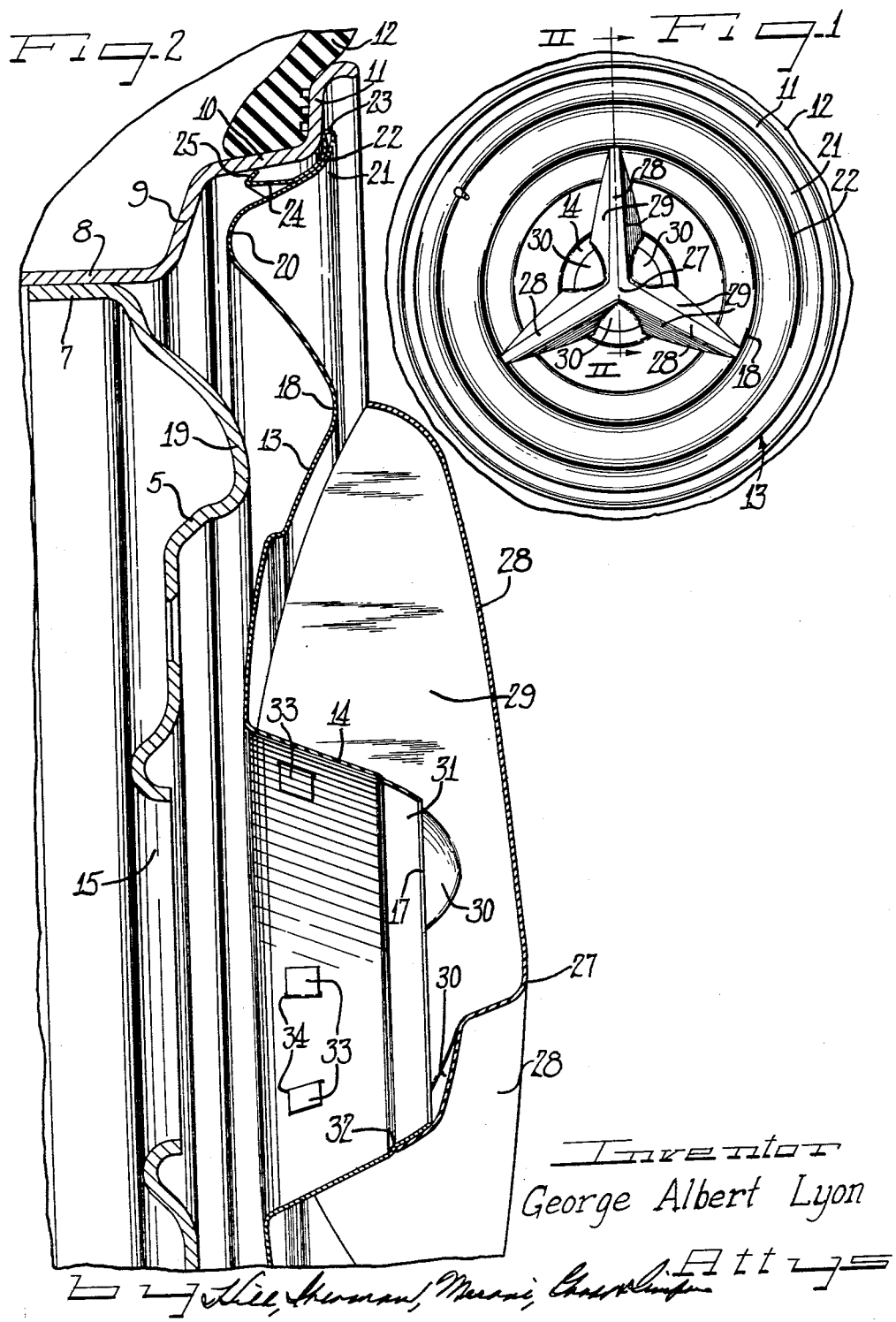

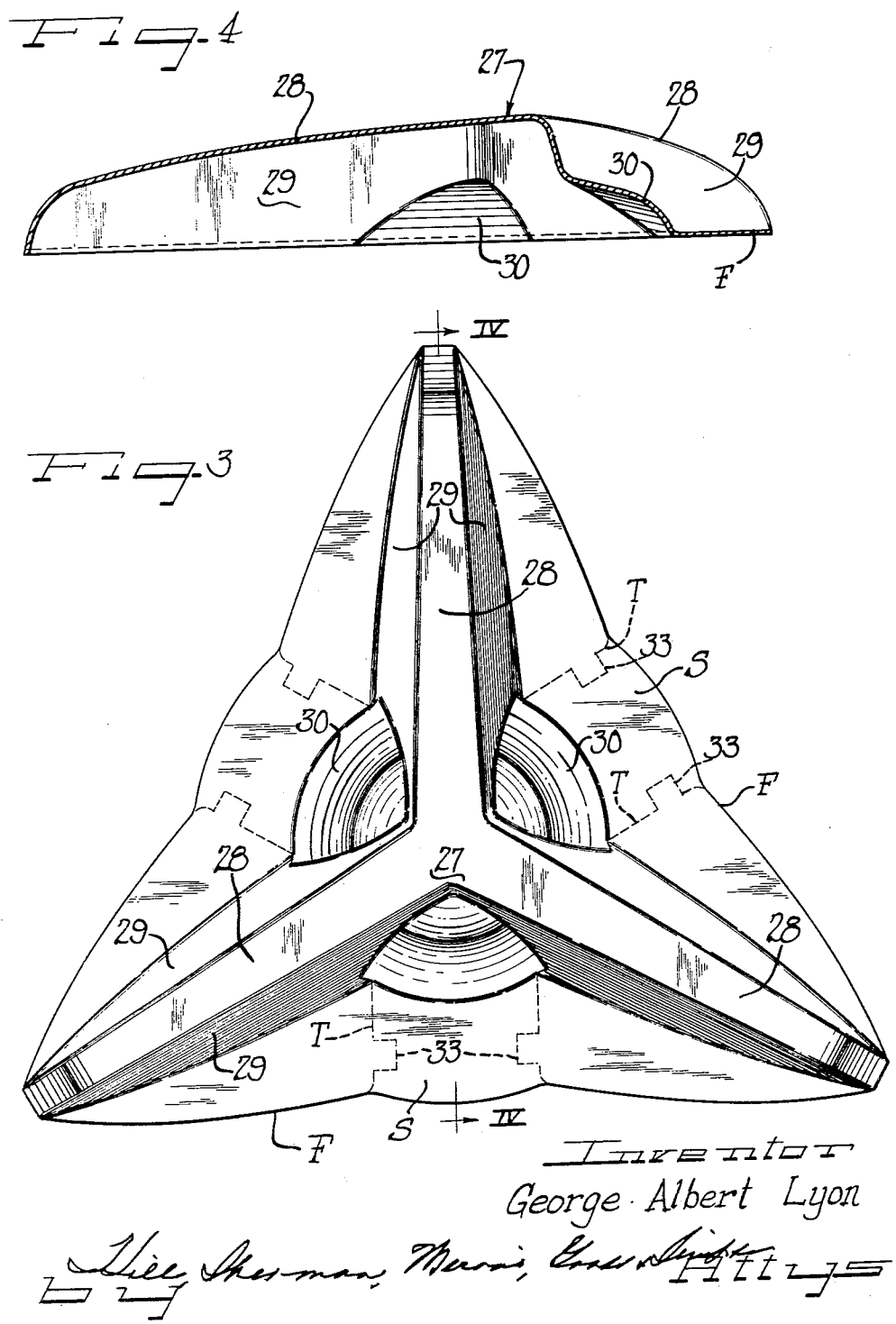

3,015,295
METHOD OF MAKING SHEET METAL WHEEL COVER MEMBERS
George Albert Lyon, Detroit, Mich., assignor to Lyon Incorporated, Detroit, Mich., a corporation of Delaware
Original application July 1, 1955, Ser. No. 519,341, now Patent No. 2,935,358, dated May 3, 1960. Divided and this application Apr. 30, 1958, Ser. No. 732,016
4 Claims. (Cl. 113—116)

The present invention relates to improvements in making sheet metal wheel cover members, and more particularly concerns the making of cap members for attachment to wheel cover plates to afford the appearance of a knock-off type handle structure affording a sporty appearance for the wheels carrying the covers.

Pressed or drawn sheet metal wheel covers are now standard equipment on most automobiles. For affording the general appearance of sport type car wheels, or to provide ornamental effect of the cover having spokes thereon it may be desirable to provide an attachment for the central portion of a cover plate in order to afford the desired visual effect.

It is therefore an important object of the present invention to provide an improved method of making from sheet metal a cap-like member with radiating spoke-like arms for disposition over the central portion of a vehicle wheel cover.

Another object is to provide a novel method of drawing a central arm member for wheel covers.

Other objects, features and advantages of the present invention will be readily apparent from the following detailed description of a preferred embodiment thereof taken in conjunction with the accompanying drawings, in which:

FIGURE 1 is an outer side elevational view of a vehicle wheel structure embodying features of the invention;

FIGURE 2 is an enlarged fragmentary diametrical sectional view taken substantially on the line II—II of FIGURE 1;

FIGURE 3 is an enlarged developed elevational view of the central ornamental cover member in an intermediate stage of formation thereof; and FIGURE 4 is a transverse sectional view taken substantially on the line IV—IV of FIGURE 3.

A wheel cover as shown in FIGURES 1 and 2 is adapted to be applied to the outer side of a vehicle wheel including a disk spider wheel body 5 provided at the radially outer margin thereof with an axially extending attachment flange 7 suitably secured to a base flange 8 of a tire rim of the drop center multi-flange type. Extending generally radially and axially outwardly from the outer side of the base flange is a side flange 9 that merges with an intermediate generally axially outwardly and radially outwardly sloping flange 10 at the outer side of which is a generally radially outwardly and then axially outwardly turned terminal flange 11.

A pneumatic tire 12 of the tubeless type may be carried by the tire rim but a pneumatic tire and tube assembly may be mounted on the rim if desired.

In the present instance the cover is shown as of the full disk type which is adapted to substantially entirely cover the outer side of the wheel. To this end, the cover includes a main circular body portion or member 13 which is preferably made from suitable sheet material such as stainless steel, brass, or other suitable alloy that is susceptible of shaping and finishing as desired. For example, the cover plate 13 may be stamped or drawn to shape substantially according to the method in my Patent No. 2,707,449 issued May 3, 1955 and then polished and plated or otherwise appropriately externally finished.

By preference, the cover plate 13 is shaped to generally simulate in a more or less idealized manner and decoratively the outer side of the wheel and has at the central portion thereof an axially outwardly projecting crown portion 14 of a diameter to overlie a central bolt-on flange aperture 15 through which the hub structure of a vehicle axle is adapted to project when the wheel is applied to the axle. Thus, the hub that projects through the aperture 15 is accommodated within the substantial chamber defined by the central crown portion 14 of the wheel cover. If preferred, in order to facilitate drawing, or for other reasons, the axially outer extremity of the crown may be open to provide an aperture 17 coaxial with the hub clearing aperture 15 in the wheel body.

From the base end portion of the crown 14, the cover plate extends generally radially and axially outwardly in overlying relation to the wheel body and with a generally axially outwardly directed annular bulge portion 18 lying generally opposite an annular axially outwardly projecting intermediate nose bulge 19 of the wheel body. Radially outwardly from the bulge portion 18 is an annular axially inwardly dished portion 20 of the cover plate adapted to lie opposite the side flange 9 of the tire rim and to extend into the outwardly opening annular channel defined between the outer side of the tire rim and the wheel body nose bulge 19.

At the radially outer side of the dished portion 20 is a generally radially and axially outwardly turned outer marginal portion 21 of the cover having an underturned flange 22 providing at the outer extremity of the cover a turned reinforcing and finishing bead edge 23 adapted to engage the outer side of the inner portion of the terminal flange 11 of the tire rim in assembly. The flange 22 preferably has thereon means for retaining the cover on the wheel, in the present instance comprising generally axially inwardly extending retaining finger extensions 24 provided with short and stiff generally radially and axially outwardly oblique retaining terminals 25 engageable in press-on, pry-off retaining gripping relation with the inner face of the intermediate flange 10 of the tire rim. Such a retaining finger arrangement is covered in my issued Patent No. 2,624,634 dated January 6, 1953.

As a central reinforcing and ornamental structure, the cover includes a cap member 27 which is carried in the cover assembly and as a unitary part of the cover by the central crown portion 14 of the cover plate 13. In the present instance, the member 27 is preferably in the form of a spoked or lobed construction generally simulative of a "knock-off" type handle such as is used on sport car wheels for quick removal of a wheel. To this end, the member 27 is herein shown as having a plurality of radially outwardly radiating spoke-like arms or extensions 28 extending from a center to overlie the cover plate 13 to the bulge portion 18 thereof.

Herein there are three of the radiating spoke extensions 28, but it will be appreciated that there may be a less number or a greater number as preferred. For example, there may be two of the spoke extensions diametrically oppositely directed. On the other hand, there may be four or five of the spoke extensions 28 equally spaced instead of the three shown.

Each of the spoke extensions 28 has a generally radially outwardly extending crest that is turned generally axially inwardly at its outer end. From the opposite sides of the crest of the rib extension in each instance extends a pair of divergently related wing-like side wall panels or flange 29. Adjacent the center of the member 27, the side wall panels 29 are connected together by dished, symmetrical, generally segmentally dome shaped reinforcing and stiffening gusset-like portions 30. These portions 30 cooperate to provide a central dome or cap of preferably substantially less width than the radially inner portions of the arm side wall flanges 29 and adapted to cooperate in centering, supported relation with the central crown portion 14 of the wheel cover member 13.

For cooperation with the cap portions 30, the axially outer end section of the crown portion 14 is preferably provided with an annular seating flange 31 complementary in cross-sectional shape to the inner margins defining the cap portions 30 and upon which such cap portions seat in centered relation. Positive axial placement of the member 27 relative to the crown portion 14 is attained as by means of an inset annular shoulder 32 at juncture of the flange portion 31 with the body of the crown portion 14 receptive in assembly of the inner edges of the cap portions 30. Preferably the arrangement is such that the axially inner portion of the crown portion 14 beyond the shoulder 32 will lie flush with the inner margins of the cap portions 30 in assembly.

At their edges, axially inwardly beyond the edges of the cap portions 30, the side wall flanges 29 of the arms are preferably conformed or complementary to the outer side wall of the crown portion 14 inwardly beyond the shoulder 32, so as to abut the crown portion. Preferably the axially facing edges of the wing flange 29 radially outwardly from the crown engaging portions of the edges are spaced in assembly from the underlying cover member body as best seen in FIGURE 2, thereby affording a reasonable range of relative movement in the gap thus afforded so that axially inward pressure against the outer arm member 27 will enable axially inward flexing of the cover member without imposing any strains upon the arms 28. At the same time, of course, the support afforded by the crown portion 14 for the arm member 27 by the various contacts with the crown portion not only through the cap portions 30 but also through the radially inwardly facing edge portions of the arm side walls 29 assures that the arms will be effectively supported against accidental deformation by axially inward forces thereagainst. Transverse deformation of the arms 28 is highly resisted not only by the reinforced rib construction thereof, but also by the triangular gusset-like cap portions 30 and the generally transversely and planar triangular structure and relationship of the side wall portions 29 of the arms.

Means for connecting the arm member 27 to the cover body may comprise attachment tabs or lug flanges 33 extending inwardly from the radially inwardly facing edge portions of the side walls 29 of the arms, and extending through appropriate slots 34 provided therefor in the side of the crown portion 14. The tabs 33 are bent or clenched over onto the inner side of the crown portion 14.

Since the central arm member 27 is a deeply drawn sheet metal structure, some problems have been encountered in making the same. In a preferred method of overcoming these difficulties, a flat sheet metal blank (not shown) is preliminarily drawn or stamped as shown in FIGURES 3 and 4. At this preliminary stage in the formation of the arm member, those portions of the arms 28 which are coincident with the gusset-like cap portions 30 are shaped to substantially final form with the cap portions. However, the axially inward extension portions of the side walls 29 of the arms 28 remain in a flat common plane about the entire structure between the tips of the arms 28. This flange, identified at F between each of the adjacent arms 28, is then trimmed along respective lines T, leaving the tabs 33 on the confronting edges of the respective side wall flanges. The portions S removed in this trimming are discarded as scrap. Then the flat portions of the side walls 29 are bent into common plane with the axially outer portions of the side walls and the assembly is in condition for assembly with the crown portion 14 of the cover.

This application is a division of my application Serial No. 519,341 filed July 1, 1955, now Patent No. 2,935,358, granted May 3, 1960.

It will be understood that modifications and variations may be effected without departing from the scope of the novel concepts of the present invention.

I claim as my invention:

1. In a method of making a central arm member for disposition at the outer side of a vehicle wheel cover, drawing a sheet metal blank into a plurality of generally radially extending rib-like arms with gusset-like reinforcement portions adjacent juncture of the arms and disposed between side wall portions of the arms lying in generally axial planes, during such drawing maintaining coplanar flat flanges angularly to said side wall portions between the tip portions of the arms and connecting the adjacent side wall and gusset portions as continuations therefrom, severing intermediate and limited partial portions of said flanges in line with and from the edges of said gusset-like portions to thereby separate the remaining portions of the flanges providing extensions from the side walls of the arms, and thereby leaving gaps in the flanges bounded by edges on the gusset-like portions between the side walls of the arms and also confronting edges on the separated extensions, and completing the side walls of the arms by bending said separated remaining flange portion extensions into coplanar relation to the generally axial planes of the side walls of which they are extensions.

2. In a method of making a sheet metal shell arm cap member for assembly with a cover plate and which arm cap member is characterized in that a central hollow cap structure opening toward one axial side has radiating therefrom a plurality of arms also hollow and opening toward said axial side and into the cap structure, said cap structure having segmental wall portions joining the radially inner end portions of side walls on the arms in gusset-like relation, said side walls lying in generally axial planes, the steps of forming a flat sheet metal blank into substantially the cap structure and arm formation but with generally radially extending marginal flange portions angularly to and connecting adjacent arm side walls and the segmental cap structure wall portions between such wall side portions, severing limited partial portions of said flange portions generally in line with and from said segmental cap structure wall portions and separating the flange portions into spaced apart portions, and bending the spaced apart flange portions into extensions of the arm side walls and directed in the axial direction of opening of the cap member and beyond the respective edges defining said segmental wall portions.

3. In a method of making a sheet metal shell arm cap member for assembly with a cover plate and which arm member is characterized in that a central hollow cap structure opening toward one axial side has radiating therefrom a plurality of arms also hollow and opening toward said axial side and into the cap structure, said cap structure having segmental wall portions joining the radially inner end portions of side walls on the arms in gusset-like relation, said side walls lying in generally axial planes, the steps of forming a flat sheet metal blank into substantially the cap structure and arm formation but with generally radially extending marginal flange portions angularly to and connecting adjacent arm side walls and the segmental cap structure portion between such wall side portions, trimming away limited partial portions of said flange portions aligned with and of substantially the full width of said segmental cap structure portions between the arm side walls where the flange portions respectively join the same to thereby leave only those portions of the flange portions connected to the respective arm side walls and lying angularly thereto, and then bending such remaining flange portions into substantially common generally axial planes with the arm side walls to provide extensions thereof in said axial direction and projecting beyond the respective edges of the segmental cap structure portions.

4. In a method of making a sheet metal shell arm cap member for assembly with a cover plate and which arm member is characterized in that a central hollow cap structure opening toward one axial side has radiating therefrom a plurality of arms also hollow and opening toward said axial side and into the cap structure, said cap structure having segmental wall portions joining the radially inner end portions of side walls on the arms in gusset-like relation, said side walls lying in generally axial planes, the steps of forming a flat sheet metal blank into substantially the cap structure and arm formation but with generally radially extending marginal flange portions connecting adjacent arm side walls and the segmental cap structure portion between such wall side portions, trimming from said flange portions intermediate limited partial areas generally aligned with said cap structure segmental wall portions and in such trimming forming on the remaining trimmed edges of the remaining flange portions tabs that project toward one another, and then bending said remaining flange portions into extensions of said arm side walls in said axial direction.

References Cited in the file of this patent

UNITED STATES PATENTS

| | | |
|---|---|---|
| 1,161,628 | De Gaesta | Nov. 23, 1915 |
| 1,270,059 | Schaefer | June 18, 1918 |
| 1,915,769 | Thomas | June 27, 1933 |
| 2,127,597 | Horn | Aug. 23, 1938 |
| 2,228,736 | Starworth | Jan. 14, 1941 |